United States Patent [19]

Hoshino et al.

[11] Patent Number: 4,613,628
[45] Date of Patent: Sep. 23, 1986

[54] RESIN COMPOSITION FOR CLOSED-CELL FOAM AND CURED RESIN FOAM PREPARED BY USING SAID RESIN COMPOSITION

[75] Inventors: Yutaka Hoshino, Kawanishi; Koji Kataoka; Yasumasa Asanaka, both of Takarazuka, all of Japan

[73] Assignee: Ferro Enamels (Japan) Limited, Osaka, Japan

[21] Appl. No.: 668,216

[22] Filed: Nov. 5, 1984

[51] Int. Cl.⁴ .................................................. C08J 9/08
[52] U.S. Cl. ......................................... 521/72; 521/89; 521/92; 521/93; 521/138
[58] Field of Search ............... 521/62, 63, 138, 89, 521/92, 93, 64, 72

[56] References Cited

U.S. PATENT DOCUMENTS

| | | | |
|---|---|---|---|
| 3,479,303 | 11/1969 | Wieschollek et al. | 521/69 |
| 3,823,098 | 7/1974 | Joslyn | 521/111 |
| 3,884,844 | 11/1975 | Jacobs et al. | 521/111 |
| 4,028,289 | 6/1977 | Brown | 521/117 |
| 4,119,583 | 10/1978 | Filip et al. | 521/103 |
| 4,151,335 | 4/1979 | Cozzi et al. | 521/138 |
| 4,216,294 | 8/1980 | Halle et al. | 521/99 |
| 4,347,331 | 8/1982 | Self | 521/119 |

FOREIGN PATENT DOCUMENTS 939100 12/1973 Canada .
57-45781 9/1982 Japan .
652770 5/1951 United Kingdom .
1214427 11/1970 United Kingdom .

OTHER PUBLICATIONS

P. E. Stott, et al., "A New Way to Form Unsaturated Polyester", Modern Plastics, Jul. 1981, pp. 72–77.
G. Forger, "Ready for the Second Round Foamed Polyesters", Plastic World, Oct. 1981, pp. 74–81.
M. Rogers, "Blowing Agents", Plastic Technology, Jul. 1981, pp. 87–88.

*Primary Examiner*—Morton Foelak
*Attorney, Agent, or Firm*—Sherman and Shalloway

[57] ABSTRACT

Disclosed is a composition for formation of a cured resin foam, which comprises (A) a curable resin composition comprising an unsaturated polyester prepolymer and an ethylenically unsaturated monomer, (B) an inorganic powder composed of a carbonate and/or bicarbonate, (C) an aqueous solution of a water-soluble inorganic compound containing a neutralizable acid radical and being capable of forming a colloidal oxide or hydroxide and being gelled by neutralization or an acidic aqueous sol of an inorganic oxide or hydroxide containing a neutralizable acid radical and being capable of being gelled by neutralization, and (D) a substantially water-insoluble surface active agent having a W/O type emulsion-forming capacity, wherein an emulsion structure having a continuous phase of the component (A) and a dispersed particle phase of the component (C) is formed.

30 Claims, 2 Drawing Figures

RESIN COMPOSITION FOR CLOSED-CELL FOAM AND CURED RESIN FOAM PREPARED BY USING SAID RESIN COMPOSITION

BACKGROUND OF THE INVENTION (1) Field of the Invention

The present invention relates to a resin composition for formation of a closed-cell foam of a thermosetting polyester resin having a uniform cell size and a uniform cell distribution. Furthermore, the present invention relates to a cured resin foam excellent in the heat resistance, which is prepared from this resin composition.

(2) Description of the Prior Art

A setting polymerizable composition comprising an unsaturated polyester prepolymer and an ethylenically unsaturated monomer is known and called "an unsaturated polyester resin". By utilizing excellent mechanical properties and high chemical resistance, this composition is widely used for formation of various structures and liners of various devices.

It has also been known from old that this thermosetting polyester resin is formed into a foamed structure. For example, there are known a process in which a volatile blowing agent and a nucleating agent are incorporated into a setting polymerizable composition and blowing is effected (see the specification of U.S. Pat. No. 3,884,844), a process in which blowing is effected by using a bicarbonate (see the specification of U.S. Pat. No. 4,028,289) and a process in which a carbonate and/or bicarbonate and an aqueous solution of basic aluminum chloride are incorporated in a setting polymerizable composition and blowing is effected (see the specification of U.S. Pat. No. 4,347,331).

In the production of a foam of a thermosetting polyester resin, it is difficult to uniformly disperse a blowing agent or nucleating agent in a setting resin composition, and if the blowing agent is not uniformly dispersed, the state of dispersion of cells becomes heterogeneous and the cell size becomes uneven. Moreover, it is difficult to cause blowing of the composition, thickening of the composition and curing polymerization at a good timing. For example, if blowing and thickening are not performed at a good timing, breakage or collapse of cells is caused or cells are connected to one another, resulting in reduction of the physical properties and the expansion ratio of the obtained foam. Furthermore, if blowing is caused in the stage where curing polymerization is being advanced, cell walls of the foam are broken or torn or a stress is left in the cell walls, and also in this case, the physical properties of the foam are reduced.

Still further, in view of the properties of the obtained cured resin foam, it is difficult to obtain a product in which cells are uniform through the entire structure and the expansion ratio is high, and even if a foamed product having a high expansion ratio is obtained, this product is defective in that many cracks are formed in the interior by the heat generated at the time of curing.

SUMMARY OF THE INVENTION

We found that when a carbonate and/or bicarbonate and an aqueous solution of a water-soluble inorganic compound containing a neutralizable acid radical and being capable of forming a colloidal oxide or hydroxide by neutralization are incorporated into a curable polyester resin composition, if there is formed an emulsion, that is, a water-in-oil type emulsion, in which the resin composition forms a continuous phase and the aqueous solution forms a dispersed phase of particles, there can be obtained a cured polyester foam of the closed-cell type having a uniform cell size, a uniform cell distribution, a high expansion ratio and such an excellent heat resistance as capable of resisting the heat generated at the time of curing.

It is a primary object of the present invention to provide a thermosetting polyester resin composition for formation of a foamed structure, in which the defects of the conventional techniques are overcome.

Another object of the present invention is to provide a thermosetting polyester resin composition for formation of a foamed structure, which has a novel dispersion structure and in which thickening, curing polymerization and blowing of the resin are performed at a good timing.

Still another object of the present invention is to provide a cured polyester foam having a uniform cell size, a uniform cell distribution, a high expansion ratio and an excellent heat resistance.

More specifically, in accordance with the present invention, there is provided a composition for formation of a cured resin foam, which comprises (A) a curable resin composition comprising an unsaturated polyester prepolymer and an ethylenically unsaturated monomer, (B) an inorganic powder composed of a carbonate and/or bicarbonate, (C) (i) an aqueous solution of a water-soluble inorganic compound containing a neutralizable acid radical and being capable of forming a colloidal oxide or hydroxide and being gelled by neutralization or (ii) an acidic aqueous sol of an inorganic oxide or hydroxide containing a neutralizable acid radical and being capable of being gelled by neutralization, and (D) a substantially water-insoluble surface active agent having a W/O type emulsion-forming capacity, wherein an emulsion structure having a continuous phase of the component (A) and a dispersed particle phase of the component (C) is formed.

DETAILED DESCRIPTION OF THE PREFERRED EMBODIMENTS

The curable polyester resin composition for formation of a foam according to the present invention comprises (A) a curable resin composition comprising an unsaturated polyester prepolymer and an ethylenically unsaturated monomer, (B) an inorganic powder composed of a carbonate and/or bicarbonate and (C) an aqueous solution of a water-soluble inorganic compound containing a neutralizable acid radical and being capable of forming a colloidal oxide or hydroxide and being gelled by neutralization or an acidic aqueous sol of an inorganic oxide or hydroxide containing a neutralizable acid radical and being capable of being gelled by neutralization, and the composition of the present invention is prominently characterized in that in addition to the foregoing components (A), (B) and (C), the composition further comprises (D) a surface active agent having a W/O type emulsion-forming capacity and an emulsion structure having a continuous phase of the component (A) and a dispersed particle phase of the component (C) is formed in the composition.

Figure 1:
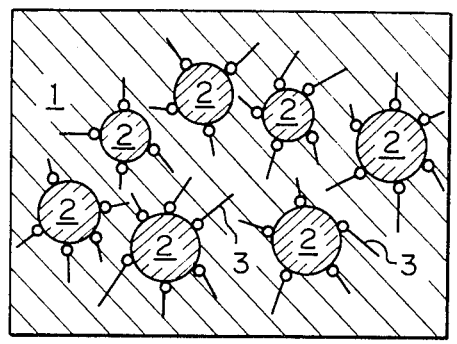
FIG. 1 is a view diagrammatically illustrating the dispersion structure of the thermosetting polyester resin composition of the present invention.

The dispersion structure of the resin composition of the present invention in the uncured state is shown in FIG. 1. In the resin composition of the present invention, the curable resin composition (A) is present as a continuous phase (dispersion medium phase) 1 and the aqueous solution or aqueous sol (C) is present as a dispersed particle phase 2 which is formed by the emulsifying action of the surface active agent 3 as the component (D). The dispersed particle phase 2 is present in the form of spherical particles having a very fine diameter, and in many cases, the diameter of the particles is 0.1 to 50 μm, especially 0.2 to 20 μm. It will readily be understood that a so-called water-in-oil type emulsion structure is formed in the composition of the present invention in the uncured state.

Formation of this dispersion structure is mainly accomplished by addition of the specific surface active agent (D), though the formation of the dispersion structure is influenced to some extent by the chemical composition of the resin component (A) or the quantity ratio of the component (A) to the component (C). Namely, the W/O type emulsion structure in the composition can be formed only when a substantially water-insoluble surface active agent having a W/O emulsion-forming capacity is incorporated. When a water-soluble surface active agent customarily used for formation of an emulsion is incorporated, it is difficult to stably form an W/O type emulsion intended in the present invention (see Example 8 given hereinafter). It is considered that the surface active agent used in the present invention is present in the state dissolved in the liquid resin composition (A) as the continuous phase 1 and reduces the surface tension of this liquid, whereby a W/O type emulsion is formed.

In addition to the above-mentioned components, an inorganic powder composed of a carbonate and/or bicarbonate is present in the resin composition of the present invention. This inorganic powder is present in the state dispersed as fine particles 3 in the continuous phase 1 of the resin composition, as shown in FIG. 1. The resin composition may further comprise known additives customarily added to thermosetting polyesters, such as a polymerization catalyst (radical initiator), a filler and a colorant, in known amounts.

It can easily be confirmed from the following facts that a so-called W/O type emulsion is formed in the composition of the present invention. In the first place, the composition has a milky white appearance inherent to an emulsion, and from this fact, it is confirmed that the composition is an emulsion. In the second place, when one drop of the composition is placed in the view under a microscope and is contacted with a drop of water or oil, the drop of the composition is easily miscible with the oil drop, and therefore, it is confirmed that the composition is a W/O type emulsion. It is preferred that the dispersed particle phase of the component (C) be present in the form of particles having a size of 0.1 to 50 μm, especially 0.2 to 20 μm.

Figure 2:
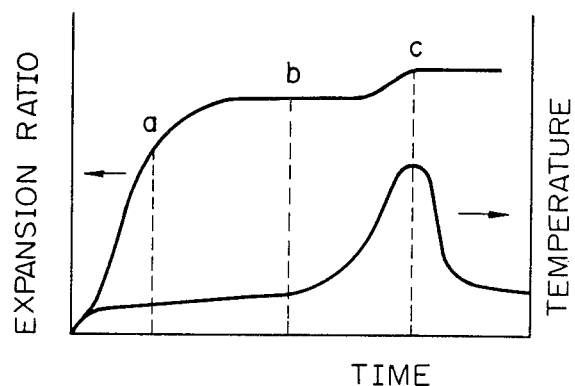
FIG. 2 is a graph illustrating the relation among the expansion ratio, the temperature and the standing time in the resin composition of the present invention.

When the composition of the present invention is used for formation of a cured resin foam, thickening and blowing of the composition are performed at a good timing irrespectively of the curing time of the composition, and the curing polymerization time can optionally be selected if it is longer than 2 minutes. Furthermore, a closed-cell type foam having a high expansion ratio can be obtained. In FIG. 2, the standing time of the composition is plotted on the abscissa, and the left ordinate indicates the expansion ratio and the right ordinate indicates the temperature of the composition. The symbol a represents the set time, that is, the time required for bringing about the state where thickening is completed and cells are set and do not collapse at all, and the symbol b stands for the gel time, that is, the time required for initiation of gelation of the resin. The symbol c represents the cure time, that is, the time required for obtaining a peak of generation of the heat in the resin. The composition of the present invention comprises the component (C), that is, (i) an aqueous solution of a water-soluble inorganic compound containing a neutralizable acid radical and being capable of forming a colloidal oxide or hydroxide and being gelled by neutralization or (ii) an acidic aqueous sol of an inorganic oxide or hydroxide containing an neutralizable acid radical and being capable of being gelled by neutralization (hereinafter referred to as "acidic aqueous solution or sol"), and the component (C) is present in the form of a dispersed particle phase in a continuous phase of the liquid resin composition. This dispersed particle phase contacts and reacts with the component (B), that is, a carbonate and/or bicarbonate, whereby blowing and thickening are simultaneously advanced while keeping the continuous phase of the liquid resin composition (set time). After the formed cells have been uniformly distributed and thickening of the composition has been completed, curing polymerization of the liquid resin composition as the continuous phase is advanced and completed (gel time and cure time). Curing polymerization of a polyester resin composition is initiated after a considerably long induction period which is due to the polymerization inhibiting action of oxygen. In the composition of the present invention, this curing polymerization is completed within a relatively short time because closed cells of carbon dioxide gas are enveloped in the liquid resin composition. The foregoing times differ according to the kinds and proportions of the respective components, but in the present invention, ordinarily, the set time a is 10 to 60 seconds, the gel time b is 5 to 20 minutes, and the cure time c is 20 to 80 minutes.

In the present invention, if an unsaturated polyester prepolymer having an acid value of 5 to 35, a hydroxyl value of 10 to 45 and a number average molecular weight of 1500 to 3500 is used as the unsaturated polyester prepolymer, a very stable W/O type emulsion can be easily formed. A known unsaturated polyester prepolymer, especially one derived from at least one polybasic carboxylic acid containing an ethylenically unsaturated polycarboxylic acid, and at least one diol, can be used, so far as the above requirements are satisfied. As the ethylenically unsaturated polycarboxylic acid, there can be mentioned maleic acid, maleic anhydride, fumaric acid, itaconic acid, tetrahydrophthalic anhydride and 3,6-endomethylene-tetrahydrophthalic anhydride. As the polybasic carboxylic acid to be used in combination with the ethylenically unsaturated polycarboxylic acid, there can be mentioned phthalic anhydride, isophthalic acid, terephthalic acid, tetrachlorophthalic anhydride, adipic acid, sebacic acid and succinic acid. As preferred examples of the diol component, there can be mentioned ethylene glycol, diethylene glycol, triethylene glycol, 1,2-propylene glycol, butane diol, neopentyl glycol, hydrogenated bisphenol A, 2,2-bis(4-hydroxyethoxyphenyl)propane and 2,2-bis(4-hydroxypropoxyphenyl)propane.

When the acid value or hydroxyl value of the unsaturated polyester prepolymer is larger than the upper limit of the above range, the hydrophilic characteristic becomes excessive and no good results can be obtained. If the acid value or hydroxyl value is too small and below the above range, the compatibility with water becomes too low. In each case, a stable W/O type emulsion cannot be formed. Also the molecular weight of the prepolymer is important. If the number average molecular weight of the prepolymer is outside the above-mentioned range, it is difficult to form a stable W/O type emulsion.

At least one radical-polymerizable non-hydrophilic liquid monomer is used as the ethylenically unsaturated monomer. Of course, the monomer should be combined with the polyester prepolymer so that a homogeneous solution can be formed. As preferred examples of the monomer, there can be mentioned vinyl aromatic compounds such as styrene, vinyltoluene, α-methylstyrene and divinylbenzene, and ethylenically unsaturated ester monomers such as ethyl acrylate, methyl methacrylate, diallyl phthalate and triallyl cyanurate. Of course, monomers that can be used in the present invention are not limited to those exemplified above. It is preferred that the weight ratio of the unsaturated polyester prepolymer to the ethylenically unsaturated monomer be from 70/30 to 45/55, especially from 65/35 to 55/45. It also is preferred that the monomer solution of the prepolymer should have a viscosity of 50 to 1000 cps as measured at 25° C.

A radical polymerization initiator is used for promoting curing polymerization of the composition under an ambient condition. As the radical polymerization initiator for curing at normal temperature, a combination of an organic peroxide and a promoter is preferably used. As preferred examples of the organic peroxide, there can be mentioned benzoyl peroxide, t-butyl perbenzoate, lauroyl peroxide, dicumyl peroxide and methylethyl ketone peroxide. As the promoter, there are preferably used dimethylaniline, diethylaniline, dimethyl-p-toluidine, n-dodecylmercaptan, ascorbic acid, cobalt naphthenate and cobalt octenate. The initiator is ordinarily incorporated in the final composition in a catalytic amount, that is, 0.1 to 4% by weight based on the curable resin composition. Of course, curing polymerization using ionizing radiations such as electron beams, gamma rays and X-rays or curing polymerization under irradiation with ultraviolet rays by incorporation of a photosensitizer may be adopted instead of curing polymerization using the above-mentioned organic peroxide polymerization initiator.

The carbonate and/or bicarbonate used as the component (B) has a carbon dioxide gas-generating capacity by reaction with an acid. An alkali metal or alkaline earth metal carbonate or bicarbonate is suitable, and there can be mentioned sodium carbonate, sodium bicarbonate, potassium bicarbonate, calcium carbonate and magnesium carbonate. It is preferred that the carbonate and/or bicarbonate be used in the form of a fine powder having an average particle size of 0.5 to 20 μm. It also is preferred that the component (B) be used in an amount of 2 to 40% by weight, especially 5 to 25% by weight, based on the component (A).

The water-soluble compound of the acidic aqueous solution (i) can be easily determined by experiments. Namely, when an aqueous solution of a water-soluble compound is mixed with the carbonate and/or bicarbonate, if carbon dioxide gas is generated and a precipitate of a colloidal oxide or hydroxide is formed, this water-soluble compound can be used.

As preferred example of this water-soluble compound, there can be mentioned inorganic and organic acid salts of aluminum such as aluminum chloride, aluminum sulfate, aluminum acetate, aluminum polychloride and basic aluminum sulfate, tin halides such as stannic chloride and basic tin chloride, and zirconium halides such as zirconium chloride and zirconyl chloride. Among these compounds, an inorganic or organic acid salt of aluminum, especially a water-soluble basic salt of aluminum, is preferred.

The water-soluble compound as mentioned above is used in the form of an aqueous solution. Preferably, the aqueous solution contains an acid radical making a contribution to decomposition of the carbonate and/or bicarbonate in an amount corresponding to 2 to 8N, especially 3 to 6N, and the pH value of the aqueous solution is 1 to 5, especially 2.5 to 4. The solid content (nonvolatile component concentration) of the aqueous solution is preferably in the range of from 25 to 65% by weight.

In the present invention, an acidic aqueous sol (ii) of an inorganic oxide or hydroxide may be used instead of the above-mentioned aqueous solution of the water-soluble inorganic compound. As the sol of the inorganic oxide or hydroxide, there can be mentioned a sol of particles of an oxide or hydroxide of aluminum, zirconium, silicon or titanium. The particles have an average particle size of 1 to 100 mμ, which is inherent to colloidal particles, and the particles are stabilized by the acid contained in the sol. As preferred examples of the acid, there can be mentioned inorganic acids such as hydrochloric acid, sulfuric acid and phosphoric acid and organic acids such as oxalic acid, citric acid and succinic acid. As in the case of the above-mentioned aqueous solution, it is preferred that the acidic sol should contain an acid making a contribution to decomposition of the carbonate and/or bicarbonate in an amount corresponding to 2 to 8N, the pH value be 1 to 5 and the solid concentration be 15 to 50% by weight. In this acidic sol, the colloidal particles are stabilized by dint of the presence of the acid, and as the acid is consumed for the reaction with the carbonate and/or bicarbonate, thickening and gelation are caused by agglomeration of the particles.

The above-mentioned acidic solution and sol may be used singly or in combination as the component (C). It is preferred that the weight ratio of the component (A) to the component (C) be in the range of from 1/0.7 to 1/0.1, especially from 1/0.4 to 1/0.2. If the amount of the component (C) is too large and exceeds the above range, it becomes difficult to form a stable W/O type emulsion. If the amount of the component (C) is too small and below the above range, the expansion ratio is reduced and the blowing uniformity is degraded.

As the component (D), that is, the substantially water-insoluble surface active agent having a W/O type emulsion-forming capacity, there is advantageously used an alkaline earth metal salt of an organic sulfonic acid or carboxylic acid showing an anionic surface activity in the form of a sodium salt. This anionic surface active agent has a long-chain alkyl group in the molecule and a sulfonic or carboxylic acid group as the polar group. The sulfonic acid or carboxylic acid is used in the form of an alkaline earth metal salt such as a calcium salt, a magnesium salt or a barium salt. As shown in Examples given hereinafter, when an ordinary water-soluble surface active agent is used, a homogeneous and stable W/O type emulsion cannot be formed, and even when a water-insoluble surface active agent is used, if it is a nonionic surface active agent, a W/O type emulsion excellent in the homogeneity and stability cannot be obtained. An alkaline earth metal salt, especially a calcium salt, of an alkylbenzene-sulfonic acid is preferred. It is preferred that the number of the carbon atoms in the alkyl group be in the range of from 9 to 15. In order to form a stable and homogeneous W/O type emulsion, it is preferred that the component (D) be used in an amount of 0.3 to 6% by weight, especially 0.5 to 4% by weight, based on component (A).

In the present invention, the resin composition for formation of a cured foam can be obtained by mixing at a time the above-mentioned components (A) through (D) optionally together with such additives as a filler, a reinforcer and a colorant. However, it is preferred that the composition be used in the form of a two-pack type composition comprising a pack of the components of the oil phase and a pack of the components of the aqueous phase for the production of a cured foam. The first pack of the oil phase is prepared by mixing the unsaturated polyester prepolymer (A), the water-insoluble surface active agent (D) and the carbonate and/or bicarbonate (B). Namely, if the water-insoluble surface active agent (D) is dissolved in the oil phase, formation of a stable W/O type emulsion becomes possible, and if the carbonate and/or bicarbonate is homogeneously dispersed in the oil phase so that it contacts and reacts uniformly with the acidic solution or sol of the aqueous phase, a closed-cell type foam having a uniform cell structure can be obtained. The second pack of the aqueous phase comprises the above-mentioned acidic aqueous solution or sol. Ordinarily, the catalyst is incorporated in the aqueous phase and the promoter is incorporated into the oil phase. However, the catalyst may be incorporated in the oil phase or the promoter may be incorporated in the aqueous phase. An inactive filler may be incorporated in the oil phase and/or the aqueous phase, whereby the consistency of both the phases can be adjusted at an appropriate level. Generally, the oil phase of the first pack and the aqueous phase of the second pack have a viscosity of 200 to 3000 cps, especially 500 to 2500 cps.

After an W/O type emulsion has been formed by mixing the oil phase of the first pack with the aqueous phase of the second pack, the formed composition is immediately used for formation of a foamed structure. Blowing (generation of carbon dioxide gas) by the reaction between the components (B) and (C) is started promptly after mixing of both the liquids. Accordingly, there is preferably adopted a method in which the two liquids are independently fed under pressure into a spray gun or injector provided with a mixing zone and a mixture formed in the mixing zone is immediately supplied to a foam-forming zone from the extrusion portion of the spray gun or injector.

Blowing, thickening and curing of the resin composition of the present invention are advanced according to the procedures shown in FIG. 2. Since blowing and thickening of the resin composition of the present invention are advanced while retaining the state of the above-mentioned homogeneous W/O type emulsion, the foam obtained from the resin composition of the present invention has several characteristics not possessed by conventional thermosetting polyester foams.

More specifically, in accordance with one embodiment of the present invention, there is provided a cured resin foam having a cell wall formed by polymerization and curing of a resin composition comprising an unsaturated polyester prepolymer and an ethylenically unsaturated monomer and porous cells formed by decomposition of a carbonate and/or bicarbonate incorporated in said resin composition, wherein said foam has a uniform foam structure of the substantially closed-cell type characterized by a cell size of 0.3 to 2.0 mm and a density of 0.1 to 0.4 g/cm$^3$ and the foam has such a heat resistance that the flexural strength retention ratio at 100° C. based on the flexural strength at 23° C. as the standard is at least 50%.

Since blowing and thickening are performed while retaining the form of a W/O type emulsion when this cured resin foam is prepared, the cured resin foam has a uniform foam structure of the closed-cell type. Furthermore, collapsing of cells is hardly caused and blowing is uniformly advanced. Accordingly, the foam has a uniform cell size of 0.3 to 2.0 mm and the density of the foam is as small as hardly attainable in conventional foams of this type, that is, in the range of 0.1 to 0.4 g/cm$^3$.

The uniformity of the cell size can be evaluated by measuring the distribution of the cell diameters. The cured foam of the present invention has such a uniform cell that cells having a diameter of 0.5 d to 2.0 d in which d stands for the number average cell diameter of the foam occupy at least 70%, especially at least 90%, of all the cells of the foam.

Furthermore, the cured foam of the present invention has such a surprising characteristic that the flexural strength retention ratio $R_B$ at 100° C., represented by the following formula:

$$R_B = (S_{100}/S_{23}) \times 100$$

wherein $S_{23}$ stands for the flexural strength (kg/cm$^2$) of the foam at 23° C. and $S_{100}$ stands for the flexural strength (kg/cm$^2$) of the foam at 100° C., is at least 50%, especially at least 75%.

In case of a rigid polyurethane foam widely used as the conventional competitory thermosetting resin foam, as shown in Examples given hereinafter, the flexural strenth is drastically degraded at a high temperature such as 100° C., and the flexural strength retention ratio $R_B$ is lower than 30%.

The cured polyester foam of the present invention has an unfoamed polyester skin layer on the surface thereof. A foam having skin layers on both the upper and lower surfaces can be easily formed according to a method where a thin layer of a thermosetting polyester free of a blowing component is formed on a support having a parting agent layer on the surface thereof, the composition of the present invention is applied to this thin layer and blowing and curing are then performed.

Furthermore, the resin composition of the present invention is advantageously used for imparting a high rigidity to various laminates. For example, when the resin composition of the present invention is supplied between a pair of cured or uncured fiber-reinforced polyester (FRP) layers and blowing and curing are performed, a highly rigid light-weight structure having a heat- or sound-insulating capacity can be obtained. Of course, the material to be laminated is not limited to FRP, but various plastics, fibrous sheets, plywoods, gypsum plates and asbestos plates may be used.

The present invention will now be described in detail with reference to the following Examples that by no means limit the scope of the invention.

EXAMPLES 1 THROUGH 9

[Preparation of Curable Resin Composition]

An unsaturated polyester prepolymer having an acid value of 9, a hydroxyl value of 23 and a number average molecular weight of about 2600 was prepared from 10.5 moles of propylene glycol, 5 moles of isophthalic acid and 5 moles of maleic anhydride. Then, 60 parts by weight of this unsaturated polyester prepolymer and an appropriate amount of a polymerization initiator were dissolved in 40 parts by weight of monomeric styrene to form an unsaturated polyester resin having a viscosity of about 1000 cps (hereinafter referred to as "UPE-I").

[Preparation of Test Pieces]

A liquid I of the oil phase and a liquid II of the aqueous phase, each having a composition shown below, were stirred in different vessels, and they were simultaneously supplied under pressure through different lines into an injector provided with a static mixer (having a diameter of 6 mm and including 21 elements) at a mixing ratio shown below. The two-liquid mixture formed in this mixer was injected into a molding vessel having a length of 30 cm, a width of 30 cm and a depth of 5 cm, blowing and curing were performed, and the formed test piece was removed from the vessel.

The physical properties of the test piece were determined to obtain results shown in Tables 1 and 2.

EXAMPLE 1

Liquid I-1

UPE-1: 80 parts by weight
calcium carbonate (having average particle size of 10 μm): 18 parts by weight
calcium alkylbenzene-sulfonate (having 12 carbon atoms in the alkyl group): 1.8 parts by weight
dimethylaniline: 0.2 part by weight Liquid II-1 hydrous aluminum chloride ($AlCl_3.6H_2O$): 25 parts by weight
Snotex ®* 0-30 ($SiO_2$ content=30% by weight): 70 parts by weight
Edoplus ®**: 2 parts by weight
benzoyl peroxide (BPO content=75% by weight): 3 parts by weight
Note
*: acidic colloidal silica aqueous solution ($SiO_2$ content=30% by weight) supplied by Nissan Kagaku K.K.
**: sepiolite powder supplied by Takeda Yakuhin Kogyo K.K.

The liquids I-1 and II-1 were mixed at a weight ratio of 4/1 for formation of test piece 1.

EXAMPLE 2

Liquid II-2

Liquid II-1: 67 parts by weight
dried aluminum hydroxide (average particle of 10 μm): 33 parts by weight The liquids I-1 and II-2 were mixed at a weight ratio of 3/2 for formation of test piece 2.

EXAMPLE 3

Liquid II-3

Snotex ®0-30: 79 parts by weight
maleic anhydride: 15 parts by weight
Edoplus ®: 3 parts by weight
lauroyl peroxide (100%): 3 parts by weight The liquids I-1 and II-3 were mixed at a weight ratio of 4/1 for formation of test piece 3.

EXAMPLE 4

Liquid II-4 aluminum polychloride powder (Cl content of 30% by weight): 30 parts by weight
Alumina Sol #100 ®*** ($Al_2O_3$ content=10% by weight): 50 parts by weight
dried aluminum hydroxide (average particle size=10 μm): 7 parts by weight
benzoyl peroxide (75%): 3 parts by weight
Note
***: acidic colloidal alumina aqueous dispersion ($Al_2O_3$ content=10% by weight supplied by Nissan Kagaku K.K.)

The liquids I-1 and II-4 were mixed at a weight ratio of 4/1 for formation of test piece 4.

EXAMPLE 5

Liquid I-2

UPE-1: 80 parts by weight
calcium alkylbenzenesulfonate (having 12 carbon atoms in the alkyl group): 0.8 part by weight
sodium bicarbonate (average particle size=5 μm): 19 parts by weight
dimethylaniline: 0.2 part by weight Liquid II-5 aqueous solution of aluminum polychloride ($Al_2O_3$ content=23% by weight, Cl content=15% by weight): 52 parts by weight
dried aluminum hydroxide (average particle size=10 μm): 45 parts by weight
benzoyl peroxide (75%): 3 parts by weight The liquid I-2 and II-5 were mixed at a weight ratio of 3/1 for formation of test piece 5.

EXAMPLE 6

Liquid II-6 aqueous solution of basic aluminum sulfate ($Al_2O_3$ content=8% by weight, $SO_4$ content=12% by weight): 55 parts by weight
kaolin (average particle=5 μm): 42 parts by weight
benzoyl peroxide (75%): 3 parts by weight The liquids I-2 and II-6 were mixed at a weight ratio of 2/1 for formation of test piece 6.

EXAMPLE 7

Liquid I-3

UPE-1: 80 parts by weight
calcium carbonate (average particle size=10 μm): 9 parts by weight
sodium bicarbonate (average particle size=5 μm): 9 parts by weight
calcium alkylbenzene-sulfonate: 1.8 parts by weight dimethylaniline: 0.2 part by weight The liquids I-3 and II-1 were mixed at a weight ratio of 4/1 for formation of test piece 7.

EXAMPLE 8

Liquid I-4

UPE-1: 80 parts by weight
calcium carbonate (average particle size = 10 μm): 18 parts by weight
triethanol amine: 1.8 parts by weight
dimethylaniline: 0.2 part by weight The liquids I-4 and II-1 were mixed at a weight ratio of 4/1 for formation of test piece 8.

EXAMPLE 9

Test piece 9 was a rigid urethane foam (having an expansion ratio of 10).

TABLE 1

| Test Piece No. | Cell Size (diameter, mm) | Cell Structure | Type of Emulsion | Bulk Specific Gravity (g/cc) | Flexural Strength (23° C., kg/cm²) | Flexural Elastic Modulus (23° C. kg/cm²) | Compression Strength (23° C., Kg/cm²) |
|---|---|---|---|---|---|---|---|
| 1 | 0.5–1.3 | closed | w/o | 0.30 | 22.0 | 2050 | 37.5 |
| 2 | 0.4–1.2 | closed | w/o | 0.32 | 22.3 | 2210 | 40.2 |
| 3 | 0.8–2.0 | closed | w/o | 0.27 | * | * | * |
| 4 | 0.7–1.2 | closed | w/o | 0.29 | 22.5 | 2100 | 39.5 |
| 5 | 0.5–1.1 | closed | w/o | 0.17 | 15.0 | 1270 | 25.0 |
| 6 | 0.5–1.3 | closed | w/o | 0.14 | * | * | * |
| 7 | 0.5–1.0 | closed | w/o | 0.22 | 18.2 | 1340 | 28.6 |
| 8 | ** | open | o/w | 0.48 | * | * | * |
| 9 | 0.2–0.4 | closed | — | 0.11 | 12.6 | 324 | 9.0 |

Note
*not measured
**measurement was impossible

TABLE 2

| Test Piece No. | Flexural Strength (kg/cm²) | | | Flexural Elastic Modulus (kg/cm²) | | |
|---|---|---|---|---|---|---|
| | 23° C. | 50° C. | 100° C. | 23° C. | 50° C. | 100° C. |
| 1 | 22.0 | 21.7 (99%) | 18.2 (83%) | 2050 | 1950 (95%) | 1190 (58%) |
| 4 | 22.5 | 22.6 (100%) | 17.8 (79%) | 2100 | 1975 (94%) | 1220 (54%) |
| 5 | 15.0 | 16.1 (107%) | 12.3 (82%) | 1270 | 1205 (95%) | 755 (59%) |
| 9 | 12.6 | 9.8 (78%) | 2.9 (23%) | 324 | 243 (75%) | 123 (38%) |

Note
Each parenthesized value is a strength retention ratio at the indicated temperature based on the value at 23° C.

We claim:

1. A composition for formation of a cured resin foam, which comprises (A) a curable resin composition comprising an unsaturated polyester prepolymer and an ethylenically unsaturated monomer, (B) an inorganic powder composed of a carbonate and/or bicarbonate, (C) an aqueous solution of a water-soluble inorganic compound containing a neutralizable acid radical and being capable of forming a colloidal oxide or hydroxide and being gelled by neutralization or an acidic aqueous sol of an inorganic oxide or hydroxide containing a neutralizable acid radical and being capable of being gelled by neutralization, and (D) a substantially water-insoluble surface active agent having a W/O type emulsion-forming capacity, wherein an emulsion structure having a continuous phase of the component (A) and a dispersed particle phase of the component (C) is formed.

2. A composition as set forth in claim 1, wherein the unsaturated polyester prepolymer has an acid value of 5 to 35, a hydroxyl value of 10 to 45 and a number average molecular weight of 1500 to 3500.

3. A composition as set forth in claim 1, wherein the ethylenically unsaturated monomer is a water-insoluble liquid monomer.

4. A composition as set forth in claim 1, wherein the carbonate and/or bicarbonate is an alkali metal or alkaline earth metal carbonate or bicarbonate.

5. A composition as set forth in claim 1, wherein the carbonate and/or bicarbonate is present in the state dispersed in the continuous phase of the resin composition.

6. A composition as set forth in claim 1, wherein the aqueous solution of the water-soluble inorganic compound or the acidic aqueous sol contains the acid radical in an amount corresponding to 2 to 8N and has a pH value of 1 to 5.

7. A composition as set forth in claim 1, wherein the surface active agent is an alkaline earth metal salt of a sulfonic acid or carboxylic acid having a long-chain alkyl group.

8. A composition as set forth in claim 1, wherein the surface active agent is calcium alkylbenzenesulfonate.

9. A composition as set forth in claim 1, wherein the components (A) and (C) are present at a weight ratio of from 1/0.7 to 1/0.1.

10. A composition as set forth in claim 1, wherein the component (B) is present in an amount of 2 to 40% by weight based on the component (A).

11. A composition as set forth in claim 1, wherein the component (D) is present in an amount of 0.3 to 6% by weight based on the component (A).

12. A composition as set forth in claim 1, which further comprises (E) a radical polymerization initiator.

13. A composition as set forth in claim 1, which further comprises an inactive filler in a known amount.

14. A cured resin foam having a cell wall formed by polymerization and curing of a resin composition comprising an unsaturated polyester prepolymer and an ethylenically unsaturated monomer and porous cells formed by decomposition of a carbonate and/or bicarbonate incorporated in said resin composition, wherein said foam has a uniform foam structure of the substantially closed-cell type characterized by a cell size of 0.3 to 2.0 mm and a density of 0.1 to 0.4 g/cm³ and the foam has such a heat resistance that the flexural strength retention ratio at 100° C. based on the flexural strength at 23° C. as the standard is at least 50%.

15. A water-in-oil emulsion forming curable resin composition which is capable of forming a cured closed cell resin foam comprising
- (I) a continuous oil phase-forming component comprising (A) a homogeneous mixture of a curable resin composition comprising an unsaturated polyester prepolymer and a liquid ethylenically unsaturated monomer;
- (II) a dispersed particle aqueous phase-forming component comprising (C)(i) an aqueous solution of a water-soluble metal compound containing a neutralizable acid radical and which forms a colloidal oxide or hydroxide and thickens upon neutralization or (ii) an acidic aqueous sol of an inorganic oxide or hydroxide containing a neutralizable acid radical and which thickens upon neutralization;
- (III) a source of carbon dioxide as a foaming agent comprising (B) a powder of an inorganic carbonate, bicarbonate or mixtures thereof and which decomposes upon neutralization to form carbon dioxide gas; and
- (IV) an emulsifying agent consisting essentially of (D) a substantially water-insoluble surface active agent having a W/O emulsion-forming capacity;

whereby upon mixing said components (I), (II), (III) and (IV), the curable resin composition (A) forms a continuous phase and the aqueous acidic solution (C)(i) or sol (C)(ii) forms a dispersed particle phase with said surface active agent (D) being present in said continuous phase (I) and substantially surrounding said dispersed particle phase to promote a stable W/O emulsion structure; and the dispersed particle phase (II) and carbon dioxide source (III) come into contact with each other, whereby carbon dioxide gas is generated by the neutralization of the inorganic carbonate, bicarbonate or mixture thereof and the dispersed phase (II) of the aqueous solution (C) of the water-soluble metal compound (i) or the acidic aqueous sol (ii) thickens to increase the viscosity of the emulsion and captures the generated carbon dioxide gas therein to thereby form a curable closed cellular foam having a uniform cell size.

16. The composition of claim 15 wherein (A) comprises an unsaturated polyester prepolymer having an acid value of 5 to 35, a hydroxyl value of 10 to 45 and a number average molecular weight of 1500 to 3500 and a water-insoluble liquid ethylenically unsaturaed monomer;
- (B) comprises powdery alkali metal or alkaline earth metal carbonate, bicarbonate or mixtures thereof and is dispersed in the continuous resin phase (I);
- (C) comprises the aqueous solution (i) or acidic aqueous sol (ii) containing an acid radical in an amount corresponding to 2N to 8N and has a pH of from 1 to 5; and
- (D) comprises an alkaline earth metal salt of a sulfonic acid or carboxylic acid having a long-chain alkyl group.

17. The composition of claim 16 wherein the weight ratio of (A) to (C) is from 1/0.7 to 1/0.1; (B) is present in an amount of 2 to 40% by weight, based on (A); and (D) is present in an amount of 0.3 to 6% by weight, based on (A).

18. The composition of claim 15 which further comprises a radical polymerization initiator and an inactive filler.

19. The composition of claim 15 wherein (C) comprises the acidic aqueous solution (i) and said water-soluble metal compound is selected from the group consisting of aluminum chloride, aluminum sulfate, aluminum acetate, aluminum polychloride, basic aluminum sulfate, stannic chloride, basic tin chloride, zirconium chloride and zirconyl chloride.

20. The composition of claim 15 wherein (C) comprises the acidic aqueous solution (i) and the water-soluble metal compound is a water-soluble basic salt of aluminum.

21. The composition of claim 15 wherein (C) comprises the acidic aqueous sol (ii) of particles of an oxide or hydroxide of aluminum, zirconium, silicon or titanium having a particle size of from 1 to 100 m$\mu$ and a stabilizing amount of an inorganic or organic acid.

22. A stable water-in-oil emulsion obtained by mixing together the components (I), (II), (III), and (IV) of the composition of claim 15.

23. The water-in-oil emulsion of claim 22 wherein the dispersed phase (II) is present in the form of spherical particles having a diameter in the range of 0.1 to 50 $\mu$m.

24. The water-in-oil emulsion of claim 23 wherein the spherical particles have a diameter in the range of 0.2 to 20 $\mu$m.

25. The composition of claim 15 in the form of a two-pack type composition which comprises a first pack containing the components of the continuous oil phase and a second pack containing the components of the dispersed aqueous phase.

26. The two-pack type composition of claim 25 wherein the first pack comprises the curable resin composition (A), the water-insoluble surface active agent (D) and the powder (B).

27. The two-pack type composition of claim 26 wherein the second pack comprises the acidic aqueous solution or sol (C) and a radical polymerization initiator for initiating the polymerization curing of the curable resin composition (A); and said first pack further comprising a promoter for promoting said polymerization curing.

28. The two-pack type composition of claim 26 wherein the first pack further comprises a radical polymerization initiator for initiating the polymerization curing of the curable resin composition and the second pack comprises the acidic aqueous solution or sol (C) and a promoter for promoting said polymerization curing.

29. The two-pack type composition of claim 26 wherein the oil phase of the first pack and the aqueous phase of the second pack each have a viscosity of 200 to 3000 centipoises.

30. A closed cell cured resin foam shaped structure obtained by shaping and curing the water-in-oil emulsion of claim 22.

* * * * *